United States Patent Office 2,929,600
Patented Mar. 22, 1960

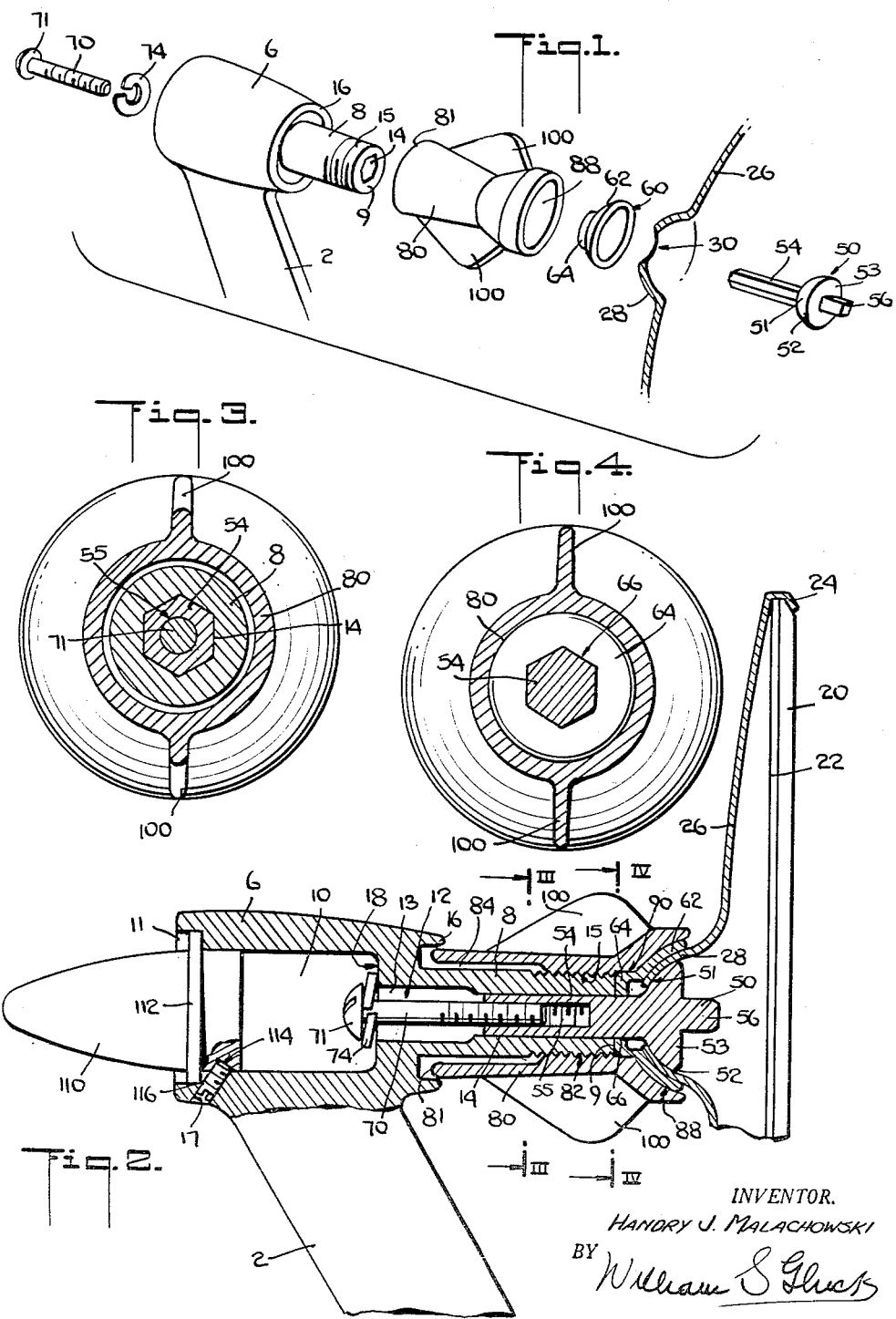

2,929,600

REAR VIEW MIRROR SUPPORTING BRACKET

Handry J. Malachowski, Jersey City, N.J., assignor to Yankee Metal Products Corp., Norwalk, Conn., a corporation of New York Application February 10, 1955, Serial No. 487,403

3 Claims. (Cl. 248—288)

This invention relates to a rear view mirror supporting bracket for vehicles and the like.

The general object of this invention is the provision of new and improved means for attaching a rear view mirror onto a supporting bracket arm so that the mirror can swivel thereon for adjustment.

A further object of this invention is the provision of new and improved means wherein a rear view mirror of the type mentioned may be easily adjusted to a desired position and readily locked therein without the use of a tool.

The accompanying drawings illustrate a preferred embodiment of my invention.

In the drawings:

Fig. 1 is an exploded perspective view showing of the elements of the illustrated embodiment;

Fig. 2 is a sectional side view showing the elements in assembled relation;

Fig. 3 is a sectional view taken along line III—III of Fig. 2; and

Fig. 4 is a sectional view taken along line IV—IV of Fig. 2.

It will be observed by reference to Fig. 2 of the drawings that the mirror supporting bracket comprises a bracket head 6 to which the mirror is secured and from which extends the bracket supporting arm 2, having at the other end a base (not shown) for mounting the mirror supporting bracket on a vehicle.

The mirror 20 has a gasket 22 therebehind and is held by the peripheral bent-over edge 24 of the mirror casing 26. The rear of the mirror casing 26 has the turned up spherical protuberance 28 located inwardly of its periphery which is shown as hollow and provided with central opening 30 there-through.

The element 50 is a swivel member which is headed as shown at 52 and from which extends, in opposite directions, the two shanks 54 and 56. The head 52 is comprised of the curved portion 51 having the shank 54 extending rearwardly therefrom and the flat portion 53 having the shank 56 extending forwardly therefrom. Both shanks 54 and 56 are shown as being non-circular. The curve of the curved portion 51 of head 52 corresponds to the curve of the spherical protuberance 28 in mirror casing 26. The shank 54 has the threaded bore 55 therein to be referred to further below.

The head 6 has the reduced portion 8 extending forwardly therefrom. The bore 10 extends through the head 6 and has the enlarged portion 11 rearwardly thereof. The reduced portion 8 has the bore 12 therethrough which communicates with bore 10. The bore 12 is a lesser diameter than the bore 10 to form shoulder 18. The bore 12 is comprised of the circular portion 13 and the non-circular portion 14 forwardly thereof. The non-circular portion 14 corresponds in cross section to the shank 54. The extension 8 is threaded at 15 for a purpose to be hereinafter referred to. The head 6 has the skirt 16 extending forwardly therefrom in spaced relation to extension 8 for a purpose to be hereinafter referred to. The head 6 also has the tap hole 17 therein for a purpose to be hereinafter referred to.

The invention contemplates the use of an adapter 60 which is comprised of the spherical concave portion 62 and the flat central base portion 64. In the drawings, the adapter 60 is shown as being wholly spherical except for the central base portion 64 which is flat. At the center of this base portion 64 is the opening 66 which is non-circular and conforms to the non-circularity of the shank 54 of headed member 50.

The invention also contemplates the use of the screw 70 which is to enter the bore 10 and be threaded into the threaded bore 55 or shank 54. Biasing means are provided to bias the screw 70 away from extension 8 and thereby bias the mirror casing 26 toward the arm 2. The biasing means are shown in the drawings as being a resilient member 74 adapted to lie between the head 71 of screw 70 and the shoulder 18.

The invention contemplates the use of a locking member 80 which is shown as a sleeve having the threaded bore 82 therein. The bore 82 opens at one end into tapered portion 84 and at its other end into the spherical cavity 88. The spherical cavity 88 conforms in contour to the concave portion 62 of the adapter 60. The spherical cavity 88 is extended forwardly to provide the tubular channel 90.

The various elements are assembled as follows: The head 52 of headed member 50 is positioned to lie within the hollow spherical protuberance 28 of the mirror casing 26 with its curved portion 51 abutting the inner face of the protuberance 28 and with its shank 54 extending through the opening 30 thereof. The locking member 80 is threaded onto the threaded portion 15 of the extension 8 so that its front end 81 lies between the skirt 16 and the extension 8. The adapter 60 has its concave portion 62 seated in the spherical cavity 88 of the locking member 80 and its flat base 64 abutting the front end face 9 of the extension 8. The shank 54 is passed through the adapter opening 66 and into the non-circular portion 14 of the base 12. The screw 70 is then passed into the bore 10 and the circular portion 13 of bore 12 and is threaded into the threaded bore 55 of shank 54 to assemble the elements together. The resilient member 74 is inserted between the head 71 of screw 70 and the shoulder 18 in the head 6 to bias the screw 70 away from extension 8 and through the headed member 50 thereby bias the mirror toward the arm 2. The non-circularity of the portion 14 of the bore 12, the opening 66 in adapter 60, and the shank 54 prevent rotation of these elements relative to each other.

It is contemplated that the device be sold assembled as described above with the screw 70 tightened sufficiently to prevent the mirror from moving freely when handled during shipping. When the operator of the vehicle desires to lock the mirror in a desired position, the locking member 80 is rotated in one direction to move it toward the mirror casing 26. This movement enables the spherical cavity 88 to tighten on the adapter 60 which, in turn, tightens onto the spherical protuberance 28. As the locking member 80 is tightened, the mirror casing 26 will move against the bias of the resilient member 74 and carry with it the headed member 50 and the screw 70. The pressure exerted by the resilient member 74 against action of the locking member 80 will lock the mirror in the desired position. When the position of the mirror is to be changed, the locking member 80 is rotated in the opposite direction to loosen the mirror and enable it to be re-set. Then the above operation is repeated to lock the mirror in place. The finger grips 100 facilitate the rotation of the locking member 80 and enable it to be turned from within the vehicle with one hand.

The cover 110 is placed in the front end of the bore 10 to prevent the accumulation of foreign substances therein. The cover 110 has the flange 112 thereon to enter the enlarged portion 11 of bore 10 and the step 114 to seat the set screw 116 presented through the tap hole 17 to lock the cover 110 in place.

It will be seen that the above-described device provides a new and improved means wherein a rear view mirror may be initially adjusted at the factory to hold the mirror in one position for final adjustment after attachment into locked position, easily and without the use of a tool.

I claim:

1. A bracket for supporting a rear view mirror which has a hollow spherical protuberance on its rear face, said bracket comprising a head mountable on a vehicle part and an outer and an inner clamping member, each adjustably associated with said head to engage and clamp said spherical protuberance therebetween, and separate means for independently adjusting each of said members into clamping engagement with one of the two opposite faces of said protuberance, said head having a front end face and a rigid washer comprised of a spherical front portion which is interposed between the outer clamping member and the outer surface of the protuberance and of a transverse flange at its rear end engaged with and seated against said front end face of the bracket head.

2. A bracket for supporting a rear view mirror which has a hollow spherical protuberance on its rear face, said bracket comprising a head mountable on a vehicle part and an outer and an inner clamping member each adjustably associated with said head to engage and clamp said spherical protuberance therebetween, and separate means for independently adjusting each of said members into clamping engagement with one of the two opposite faces of said protuberance the means which adjusts the inner clamping member with the inner face of the protuberance on the mirror rear face being yieldable normally to effect a yieldable clamping engagement and the means which adjusts the other clamping member effecting a locking arrangement.

3. A bracket as set forth in claim 2, wherein the first mentioned separate means is located internally of the bracket head and the second mentioned separate means is located externally of the bracket head, whereby the yieldable engagement may be effected in assembling the bracket parts and the locking engagement effected after the mirror and bracket assembly is secured to the vehicle.

References Cited in the file of this patent

UNITED STATES PATENTS

| | | |
|---|---|---|
| 1,349,002 | Lakin | Aug. 10, 1920 |
| 2,436,678 | Somers | Feb. 24, 1948 |
| 2,465,751 | Robins | Mar. 29, 1949 |
| 2,534,495 | Younghusband | Dec. 19, 1950 |
| 2,648,256 | Budreck | Aug. 11, 1953 |
| 2,671,630 | Whitehead | Mar. 9, 1954 |

FOREIGN PATENTS

| | | |
|---|---|---|
| 485,346 | Great Britain | June 2, 1938 |
| 649,942 | Great Britain | Feb. 7, 1951 |